(No Model.)
J. MILLER.
DEVICE FOR RELEASING ANIMALS.
No. 345,799. Patented July 20, 1886.
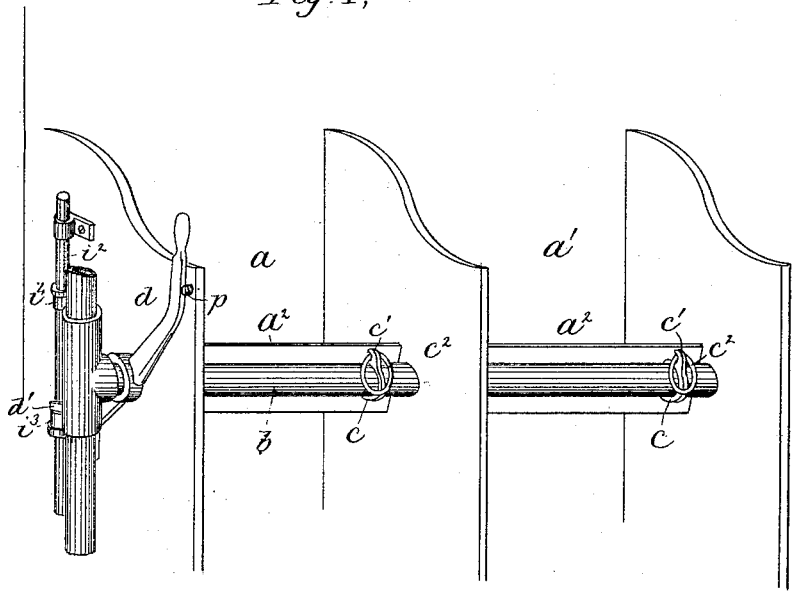
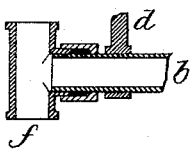
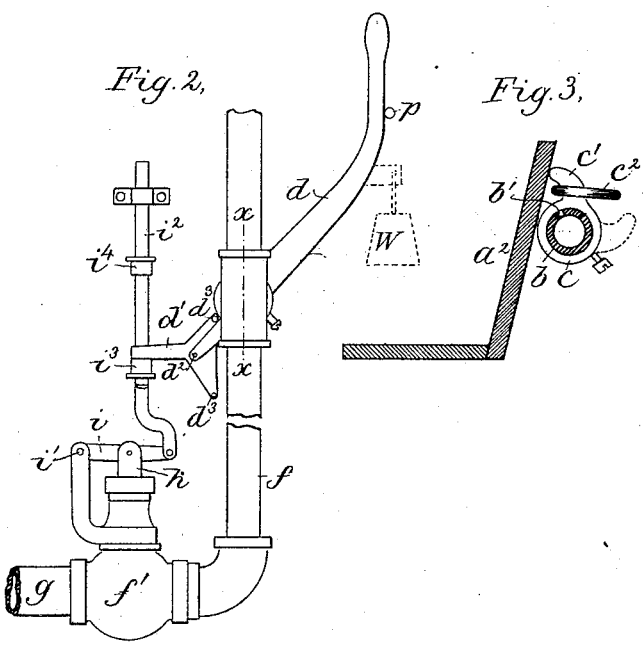
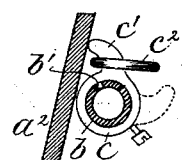
Witnesses,
Jas. J. Maloney
H. P. Bates.
Inventor,
John Miller,
by Jos. P. Livermore
Atty.
N. PETERS, Photo-Lithographer, Washington, D. C.

UNITED STATES PATENT OFFICE.

JOHN MILLER, OF CAMBRIDGE, MASSACHUSETTS.

DEVICE FOR RELEASING ANIMALS.

SPECIFICATION forming part of Letters Patent No. 345,799, dated July 20, 1886.

Application filed January 2, 1886. Serial No. 187,419. (No model.)

*To all whom it may concern:*

Be it known that I, JOHN MILLER, of Cambridge, county of Middlesex, State of Massachusetts, have invented an Improvement in Devices for Releasing Animals in Stables and Extinguishing Fire, of which the following description, in connection with the accompanying drawings, is a specification, like letters on the drawings representing like parts.

My invention relates to devices especially intended for releasing horses or other animals without loss of time when a fire breaks out, being shown as applied in stables containing a large number of stalls, and being adapted to release all the animals in the said stalls simultaneously, and to drive them out from the stalls, so that they can be rescued without loss of time in case the stable is on fire.

The invention is embodied in a device comprising a hollow shaft extending through a number of stalls and provided with fastening devices, which in one position of the said shaft serve to fasten the animals in the stalls in the usual manner, but which, when the shaft is turned from its normal position, releases or unfastens all the animals simultaneously. The said shaft is made hollow or as a pipe, and is perforated and connected with water-supplying pipes; and the invention consists, mainly, in the combination of the said perforated pipe provided with fastening devices with an actuating device for turning the said shaft, and a valve controlling the admission of water to the said shaft or pipe, operated thereby simultaneously with the turning of the shaft to admit water to the said shaft, so that it will be discharged through the perforations thereof against the animals, causing them to leave the stalls, so that they can be driven out from the stable without loss of time, the water also serving to assist in extinguishing the fire, and the devices being preferably used in connection with other perforated pipes or distributers, by which other parts of the building may be drenched, for the purpose of extinguishing the fire.

Figure 1 is a perspective view of a part of a building provided with devices for releasing animals embodying this invention; Fig. 2, an end elevation of the actuating mechanism for releasing the animals and opening the water-valve; Fig. 3, a sectional detail showing one of the fastening devices in side elevation; and Fig. 4, a sectional detail on line $xx$, Fig. 2.

The devices are especially intended to be used in a building containing a number of stalls, $a\ a'$, and so forth, placed side by side in line with one another, and provided with the usual cribs or mangers, $a^2$, the said device comprising a hollow shaft or pipe, $b$, extending through the entire line of stalls, as shown in Fig. 1, preferably just in front of the mangers, and provided in each stall with a fastening device, (best shown in Fig. 3,) consisting of a ring or collar, $c$, upon the said shaft, provided with a hook or finger, $c'$, engaging the usual fastening-ring, $c^2$, to which the halter of the animals is tied in the usual manner. When in the position shown in full lines, Fig. 3, the said finger comes against the front of the manger and confines the ring $c^2$, like the usual staple driven into the front of the manger; but by turning the shaft $b$ in the direction of the arrow, Fig. 3, for about a quarter to a third of a revolution, the hook is brought to the position shown in dotted lines, leaving the ring $c^2$ free, so that the animal is released and free to leave the stall.

In order to rotate the shaft $b$, to thus release all the rings $c^2$ and animals fastened thereto simultaneously, the said shaft is provided at a convenient point with an actuating device, shown as a lever, $d$, (see Fig. 2,) which may be turned by a single person, and will thus release simultaneously all the animals in the entire series of stalls. The said shaft or pipe $b$ is provided with perforations $b'$, which, when the shaft is turned to release the animals, are directed toward the animals in the stalls, and the said pipe is connected by a suitable joint, such as shown in Fig. 4, with a water-pipe, $f$, provided with a suitable valve, $f'$, which may be placed in the basement or below the line of frost, and controls the admission of water from a main pipe, $g$, into the said pipes $f$ and $b$. The pipe $g$ may be connected with the street-main, or with a reservoir when there is no water-supply in the street. The said valve, which may be of any suitable or usual construction, is provided with a stem, $h$, connected with a lever, $i$, fulcrumed at $i'$ and connected with a slide-bar, $i^2$, having actuating projections $i^3$ $i^4$, engaged by the lever $d$, or a rocker, $d'$, connected therewith, in such a manner that when the said lever $d$ is turned to release the animals, as before described, the rocker $d'$ engages the projections $i^4$, and through the intermediate connections opens the valve $f'$, admitting the water through pipe $f$ into the pipe $b$, so that it will be directed through the perforations $b'$ against the animals, causing them to leave the stalls, so that they can be readily driven out from the stable without loss of time, commonly occasioned by unfastening or cutting loose and driving out each animal separately, or by the necessity of driving them out from the stalls after they have been unfastened by detaching mechanism such as before used for this purpose. The rocker $d'$ is pivoted to the lever $d$ at $d^2$, and provided with projections $d^3$, which engage the said lever as the main part of the rocker comes into engagement with the projections $i^3$ $i^4$, causing it to engage them squarely.

If desired, the pipe $f$ may be continued to other parts of the building, and be provided with suitable sprinkling devices for wetting the other parts of the building, and the animal-releasing and valve-actuating mechanism may be operated automatically, as by the weight $w$, (shown in dotted lines, Fig. 2,) connected with the lever $d$, which will be normally held by a locking device or detent, $p$, that may be arranged to be operated from any part of the building, either by attendants or automatically by any of the well-known automatic devices commonly employed in fire-extinguishing apparatus for operating a valve when a fire breaks out.

I claim—

1. The combination, with a series of stalls, of a perforated pipe passing therethrough, provided with fastening devices and permanently connected with a water-supply pipe, a valve controlling the admission of water to the perforated pipe, and actuating mechanism common to the said perforated pipe and valve, whereby the former is operated to release the fastening devices, and the valve at the same time opened for admitting water to the said pipe, substantially as and for the purpose described.

2. The combination, with a series of stalls, of a perforated pipe passing therethrough, provided with fastening devices and connected with a stationary water-supply pipe, and the valve controlling the passage of water from the stationary supply-pipe to the perforated pipe, a lever connected with the perforated pipe, and connecting mechanism between the said lever and the valve-stem, substantially as described.

In testimony whereof I have signed my name to this specification in the presence of two subscribing witnesses.

JOHN MILLER.

Witnesses:
   Jos. P. Livermore,
   H. P. Bates.